(12) United States Patent
Labrot et al.

(10) Patent No.: US 12,742,988 B2
(45) Date of Patent: Sep. 22, 2026

(54) COMPOSITE PANE HAVING ELECTRICALLY CONTROLLABLE OPTICAL PROPERTIES

(71) Applicant: SAINT-GOBAIN GLASS FRANCE, Courbevoie (FR)

(72) Inventors: Michael Labrot, Aachen (DE); Adil Jaafar, Margny-les-Compiegne (FR); Amaury Patissier, Bourg-la-Reine (FR); Laurent Maillaud, Massy (FR)

(73) Assignee: SAINT-GOBAIN SEKURIT FRANCE, Thourotte (FR)

( * ) Notice: Subject to any disclaimer, the term of this patent is extended or adjusted under 35 U.S.C. 154(b) by 787 days.

(21) Appl. No.: 18/005,304

(22) PCT Filed: Aug. 24, 2021

(86) PCT No.: PCT/EP2021/073324

§ 371 (c)(1),
(2) Date: Jan. 12, 2023

(87) PCT Pub. No.: WO2022/063505

PCT Pub. Date: Mar. 31, 2022

(65) Prior Publication Data

US 2023/0258995 A1 Aug. 17, 2023

(30) Foreign Application Priority Data

Sep. 28, 2020 (EP) .................................... 20198615

(51) Int. Cl.
*G02F 1/15* (2019.01)
*B32B 17/06* (2006.01)
(Continued)

(52) U.S. Cl.
CPC .............. *G02F 1/15* (2013.01); *B32B 17/061* (2013.01); *B32B 17/10036* (2013.01);
(Continued)

(58) Field of Classification Search
CPC ....... G02F 1/157; G02F 1/155; B32B 17/061; B32B 17/10036; B32B 17/10633; B32B 17/1077; B32B 17/10788; B32B 2255/10
See application file for complete search history.

(56) References Cited

U.S. PATENT DOCUMENTS 5,321,544 A 6/1994 Parkhe et al.
5,404,244 A 4/1995 Van Dine et al.
(Continued)

FOREIGN PATENT DOCUMENTS

WO WO 2012/007334 A1 1/2012
WO WO 2017/102900 A1 6/2017
(Continued)

OTHER PUBLICATIONS

International Search Report as issued in International Patent Application No. PCT/EP2021/073324, dated Oct. 25, 2021.

*Primary Examiner* — Stephone B Allen
*Assistant Examiner* — Tamara Y. Washington
(74) *Attorney, Agent, or Firm* — CUSHMAN PARTNERS, LLC

(57) ABSTRACT

A composite pane includes outer and inner panes joined via an intermediate layer, an electrochromic functional element with electrically controllable optical properties within the intermediate layer, wherein the total solar energy transmittance in the darkened state is higher than in the bright state and/or the energy transmittance in the darkened state is higher than in the bright state, and an infrared protection layer having at least one silver-containing layer and arranged on an interior-side surface of the inner pane facing the intermediate layer, on an interior-side surface of the outer pane facing the intermediate layer, or within the intermediate layer. The infrared protection layer interacts with the functional element such that the total solar energy transmittance through the composite pane in the darkened
(Continued)

Figure 1:
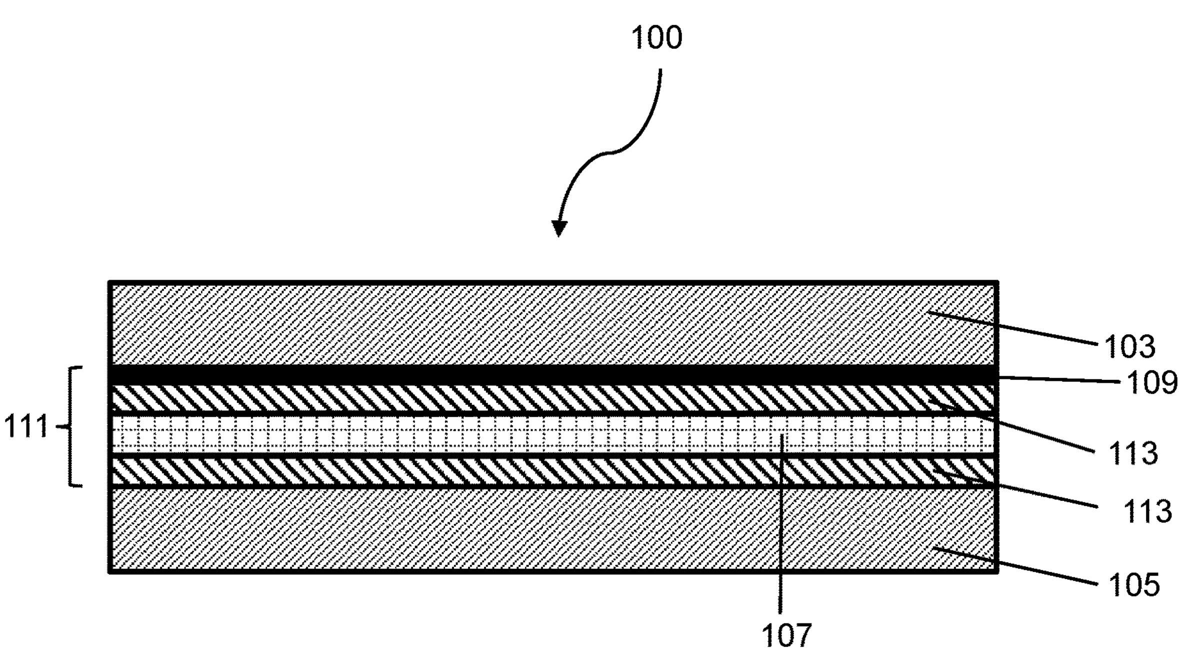

state is lower than in the bright state and/or the energy transmittance through the composite pane in the darkened state is lower than in the bright state.

18 Claims, 8 Drawing Sheets

(51) Int. Cl.
*B32B 17/10* (2006.01)
*G02F 1/155* (2006.01)
*G02F 1/157* (2006.01)

(52) U.S. Cl.
CPC .... *B32B 17/10633* (2013.01); *B32B 17/1077* (2013.01); *B32B 17/10788* (2013.01); *G02F 1/155* (2013.01); *B32B 2255/10* (2013.01); *G02F 1/157* (2013.01)

(56) References Cited

U.S. PATENT DOCUMENTS 7,372,610 B2 5/2008 Burdis et al.
7,593,154 B2 9/2009 Burdis et al.
11,001,037 B2 * 5/2021 Hagen ............... B32B 17/10761
12,023,239 B2 * 7/2024 Ma ........................ G02F 1/0121
2012/0026573 A1 2/2012 Collins et al.
2014/0022621 A1 1/2014 Kailasam et al.
2015/0274584 A1 * 10/2015 Kleinhempel .... B32B 17/10036 428/336

FOREIGN PATENT DOCUMENTS

WO WO 2018/206236 A1 11/2018
WO WO 2019/110172 A1 6/2019

* cited by examiner

COMPOSITE PANE HAVING ELECTRICALLY CONTROLLABLE OPTICAL PROPERTIES

CROSS-REFERENCE TO RELATED APPLICATIONS

This application is the U.S. National Stage of PCT/EP2021/073324, filed Aug. 24, 2021, which in turn claims priority to European patent application number 20198615.5 filed Sep. 28, 2020. The content of these applications are incorporated herein by reference in their entireties.

The present invention relates to a composite pane having electrically controllable optical properties and a method for producing a composite pane.

When a vehicle occupant closes a mechanical shade of a sliding roof, they often wish not merely to reduce the amount of light entering the vehicle interior. Instead, the intention can be to protect against heat from thermal radiation that enters the vehicle. This dimming function can be achieved by a composite pane with electrically controllable optical properties that allows changing light transmittance in reaction to an applied voltage. Electrochromic materials can be used for this.

In general, with these technologies, when dimming occurs with lower light transmittance, a decrease in heat transfer also always occurs, i.e., lower energy transmittance (TE) and lower total solar energy transmittance (TTS). Conversely, brightening with higher light transmittance is always associated with an increase in heat transfer. SPD (suspended particle devices) and some electrochromic elements function this way.

However, the inventors have found that with some electrochromic materials, between the bright state and the darkened state, a shift of the transmittance spectra into the infrared range can occur. In this case, although is the pane is darkened in the visible spectral range, thermal radiation enters the vehicle interior more intensely. This can result in unpleasant thermal irritation of the vehicle occupant.

The object of the invention is to provide a composite pane with which thermal irritations that can occur when the transmittance spectra are shifted when controlling electrochromic functional elements can be prevented.

According to a first aspect, this technical object is accomplished by a composite pane with electrically controllable optical properties having an outer pane and an inner pane that are joined to one another areally via an intermediate layer; an electrochromic functional element with electrically controllable optical properties within the intermediate layer, in which the total solar energy transmittance TTS in the darkened state is higher than in the bright state and/or the energy transmittance TE in the darkened state is higher than in the bright state; and at least one infrared protection layer that is arranged or applied on an interior-side surface of the inner pane facing the intermediate layer, on an interior-side surface of the outer pane facing the intermediate layer, or within the intermediate layer, wherein the infrared protection layer has at least one silver-containing layer. The infrared protection layer interacts with the electrochromic functional element such that the total solar energy transmittance TTS through the composite pane (100) in the darkened state is lower than in the bright state, and/or the energy transmittance TE through the composite pane (100) in the darkened state is lower than in the bright state.

The infrared protection layer has at least one silver-containing layer. The infrared protection layer blocks infrared radiation and allows visible light to pass. This composite glass pane also prevents entry of infrared radiation when a shift in the transmittance spectra occurs due to the switching of the electrochromic functional element. The composite glass pane can, for example, be used in the automotive sector. In this case, the inner pane is adjacent the vehicle interior, whereas the outer pane is adjacent the external surroundings. Electrochromic functional elements change from darkened to bright states by means of reversible redox reactions. The terms "visible spectral range" or "visible light" mean the spectral range from 380 nm to 780 nm.

In the context of the invention, "blocking infrared radiation" means that the infrared protection layer at least partially reflects and/or absorbs infrared radiation. Particularly preferably, the infrared protection layer reflects infrared radiation. The reflection of infrared radiation has the advantage that the composite pane does not heat up as intensely.

An electrochromic functional element is an element that has switchable, controllable, or adjustable optical properties. The transmittance of light can be actively influenced by applying an electrical voltage. A user incorporated in the composite pane can, for example, switch from a transparent (bright) state into a less transparent state, i.e., dark or darkened state of the composite pane. Gradations are also possible.

Electrochromic functional elements that the composite pane according to the invention can have are known to the person skilled in the art. These can, for example, be constructed as disclosed in US 5321544, US 5404244, 7372610 B2, US 7593154 B2, WO 2012/007334 A1, WO 2017/102900 A1, or US 20120026573 A1.

The electrochromic functional element preferably comprises, in the following order:

- a first flat electrode,
- a working electrode,
- an electrolyte,
- a counter electrode, and
- a second flat electrode.

The first flat electrode and the second flat electrode are intended to be electrically connected to a voltage source. All layers mentioned are preferably fixedly connected to one another. All layers mentioned are preferably arranged congruently with one another.

The working electrode is often also called an electrochromic layer; and the counter electrode, an ion store.

The working electrode and the counter electrode are capable of reversibly storing charges. The oxidation states of the working electrode in the charged and discharged state differ in their coloration, with one of the states being bright and another being darkened. The storage reaction can be controlled via the externally applied potential difference. The color of the electrochromic functional element that can be adjusted via the electrical potential is preferably set in a color range from blue to black. The electrical potential range for changing the electrochromic functional element between bright and dark is preferably from 0 V to 7 V and particularly preferably from 0.5 V to 5 V DC.

The first flat electrode and the second flat electrode are preferably transparent and electrically conductive. They preferably contain at least a metal, a metal alloy, or a transparent conducting oxide (TCO). The first flat electrode and the second flat electrode particularly preferably contain silver, gold, copper, nickel, chromium, tungsten, graphite, molybdenum, and/or a transparent conducting oxide, preferably indium tin oxide (ITO), fluorine-doped tin oxide ($SnO_2$:F), antimony-doped tin oxide, aluminum-doped zinc oxide, boron-doped zinc oxide, or gallium-doped zinc oxide.

When the first flat electrode and/or the second flat electrode are based on a metal, they preferably have a total thickness, in each case, of 1 nm to 50 nm, preferably 2 nm to 30 nm, particularly preferably 3 nm to 15 nm. When the first flat electrode and/or the second flat electrode are based on a transparent conducting oxide, they preferably have a total thickness of 20 nm to 2 μm, particularly preferably of 50 nm to 1 μm, most particularly preferably of 100 nm to 600 nm, and in particular of 300 nm to 500 nm. Thus, advantageous electrical contacting of the working electrode and the counter electrode as well as good horizontal conductivity of the layers are achieved. In the context of the invention, the first and the second flat electrode are thin layers.

When something is formed "on the basis of "/"based on" a polymeric material, it consists mainly of this material, i.e., at least 50%, preferably at least 60%, and in particular at least 70%. It can thus also contain other materials, such as stabilizers or plasticizers.

When discussing thin layers (thin films), if something is formed "on the basis" of a material, it consists mainly of this material, in particular substantially of this material in addition to any impurities or dopants.

The sheet resistance of the first flat electrode and the second flat electrode is, in total, preferably 0.01 ohm/square to 100 ohm/square, particularly preferably ohm/square to 20 ohm/square, most particularly preferably 0.5 ohm/square to 5 ohm/square. In this range, a sufficiently large current flow between the electrodes of the electrochromic functional element is ensured, enabling optimal functioning of the working electrode and the counter electrode.

The working electrode can be based on an inorganic or organic material. The working electrode is preferably based on tungsten oxide, but can also be based on molybdenum oxide, titanium oxide, or niobium oxide as well as mixtures thereof. The working electrode can be based on polypyrrole, PEDOT (poly-3,4-ethylenedioxythiophene), and polyaniline, as well as mixtures thereof. The counter electrode can, for example, be based on titanium oxide, cerium oxide, iron(III) hexacyanoferrate (II/III) ($Fe_4[Fe(CN)_6]_3$), and nickel oxide as well as mixtures thereof. The electrolyte is ionically conductive and can be formed on the basis of a layer of hydrated tantalum oxide and a layer of hydrated antimony oxide. Alternatively, the electrolyte can also be based on a polymer containing lithium ions or based on tantalum(V)-oxide and/or zirconium(IV)-oxide.

In an alternative embodiment, the electrochromic functional element contains no electrolyte, with the working electrode itself functioning as an electrolyte. For example, tungsten oxide can, depending on the oxidation state, assume the function of an electrolyte. Such embodiments are, for example, disclosed in US 2014/0022621 A1. Reference is made in particular to FIG. 4F of US 2014/0022621 A1.

The electrochromic functional element also preferably includes a first film and a second film. In this case, the first flat electrode is arranged on the first film with a surface facing away from the working electrode, and the second flat electrode is arranged on the second film with a surface facing away from the counter electrode. The first film and/or the second film are preferably transparent. The first film and/or the second film are preferably based on transparent polyethylene terephthalate, polycarbonate, and/or polycaprolactone. For this embodiment, the total layer thickness of the electrochromic functional element is preferably from 0.2 mm to 0.5 mm.

In addition, the outer pane and the inner pane have in each case an exterior-side surface facing away from the intermediate layer.

In the context of the invention, when something is arranged "areally between the outer pane and the inner pane", this means that it can be arranged on the electrochromic functional element, between the on the interior-side surface of the outer pane or the interior-side surface of the inner pane. In this case, it can be applied spatially directly on the outer pane or the inner pane or arranged by other layers, such as, a masking print, on the inner pane or the outer pane. The word "areally" means that something extends over a majority of the entire primary surface of the composite pane. Preferably, something extends over at least 60%, particularly preferably over at least 70%, most particularly preferably over at least 90%, and in particular over 100% of the primary surface of the composite pane.

The expression "bright state" in connection with the electrochromic functional element means, in the context of the invention, that the electrochromic functional element has maximal light permeability for visible light with light transmittance (TL) of at least 15%, preferably at least 30%, particularly preferably at least 50%. Correspondingly, the expression "dark state" or "darkened state" in connection with the electrochromic functional element means that the electrochromic functional element has minimal light permeability for visible light with light transmittance (TL) of at most 10%, preferably at most 5%, and in particular at most 1%.

In a particularly advantageous embodiment of the invention, the light transmittance through the composite pane (100) in the darkened state of the electrochromic functional element (107) is less than or equal to 15%, preferably less than or equal to 10%. With light transmittance is of 15% or less, the brightness is noticeably reduced for an occupant of a vehicle in which such a composite pane is used, for example, as a roof panel. This improves the comfort of the vehicle.

In a particularly advantageous embodiment of the composite pane, the infrared protection layer is arranged areally between the outer pane and the functional element. This achieves, for example, the technical advantage that infrared light cannot enter and heat the functional element and the best thermal comfort is achieved.

In another advantageous embodiment of the composite pane, the infrared protection layer is arranged areally between the inner pane and the electrochromic functional element. This achieves, for example, the technical advantage that entry of infrared light can be effectively suppressed.

In another advantageous embodiment of the composite pane, the infrared protection layer is applied on the interior-side surface of the outer pane or on a polyethylene terephthalate layer, with the polyethylene terephthalate layer arranged within the intermediate layer. The layers of the infrared protection layer can be applied in a coating process. The polyethylene terephthalate layer serves as a substrate for the metal layers. This also achieves, for example, the technical advantage that infrared light can be effectively blocked.

In another advantageous embodiment of the composite pane, the infrared protection layer comprises at least one silver layer and preferably multiple silver layers. Such silver layers have particularly advantageous electrical conductivity with, at the same time, high transmittance in the visible spectral range. The thickness of a silver layer is preferably from 5 nm to 50 nm, particularly preferably from 8 nm to 25 nm. In this range for the thickness of the silver layer, advantageously high transmittance in the visible spectral range and particularly advantageous electrical conductivity are achieved.

Preferably, in each case, at least one dielectric layer is arranged between two adjacent silver layers of the coating. Preferably, another dielectric layer is arranged below the first and/or above the last silver layer. A dielectric layer contains at least one single layer of a dielectric material, for example, containing a nitride such as silicon nitride or an oxide such as aluminum oxide. Dielectric layers can, however, also include multiple individual layers, for example, individual layers of a dielectric material, smoothing layers, matching layers, blocking layers, and/or antireflection layers. The thickness of a dielectric layer is, for example, from 10 nm to 200 nm. This achieves, for example, the technical advantage that infrared light can be effectively blocked. The blocking of infrared light is achieved particularly well when the infrared protection layer includes at least two silver layers, particularly preferably three silver layers, and in particular exactly three silver layers.

In another advantageous embodiment of the composite pane, the energy transmittance TE in the bright state of the composite pane in the spectral range from 800 nm to 2500 nm is less than or equal to 25%, preferably less than or equal to 15%, and in particular less than or equal to 5%.

Preferably, the total solar energy transmittance TTS is less than or equal to 35%, particularly preferably less than or equal to 25%, in particular less than or equal to 15% for the composite pane in the bright state. This also achieves, for example, the technical advantage that heating behind the composite glass pane is effectively reduced.

Preferably, the light transmittance TL through the composite pane in the bright state of the electrochromic functional element is greater than or equal to 5%, particularly preferably greater than or equal to 10%, and most particularly preferably greater than or equal to 20%. The light transmittance TL through the composite pane in the darkened state of the electrochromic functional element is preferably less than or equal to 10%, particularly preferably less than or equal to 5%, and in particular less than or equal to 1%. These are light transmittance levels which, in the respective case (bright or darkened) are perceived as pleasant for occupants in a vehicle with such a composite pane.

The energy transmittance TE and the total solar energy transmittance TTS are measures for the amount of heat that enters a vehicle or building through the composite pane. Therefore, very high TE or TTS values mean that the building or vehicle is absorbing a great deal of heat. This generally worsens the thermal comfort for vehicle or building occupants.

The level of light transmittance TL, energy transmittance TE, and total solar energy transmittance TTS can be averaged per ISO 9050 (2003-08) for building glazings. TE and TTS can also be determined using ISO 13837 (2008-04) for vehicle glazings. The following formula is used to calculate the TL for the visible spectral range (from 380 nm to 780 nm):

$$TL = \frac{\sum_{\lambda=380\,nm}^{780\,nm} \tau(\lambda) D_\lambda V(\lambda) \Delta\lambda}{\sum_{\lambda=380\,nm}^{780\,nm} D_\lambda V(\lambda) \Delta\lambda},$$

where $D_\lambda$ is the relative spectral distribution of the illuminant used (A) (see ISO/CIE 10526), $\tau(\lambda)$ is the spectral transmittance of the glazing, $V(\lambda)$ is the sensitivity curve of the human eye (see ISO/CIE 10527), and $\Delta\lambda$ is the wavelength interval.

The following formula is used to calculate the TE:

$$TE = \frac{\sum_{\lambda=300\,nm}^{2500\,nm} \tau(\lambda) S_\lambda \Delta\lambda}{\sum_{\lambda=300\,nm}^{2500\,nm} S_\lambda \Delta\lambda}.$$

where $S_\lambda$ is the relative spectral distribution of solar radiation. TTS is, again, the sum of TE and the secondary heat transfer. The term "secondary heat transfer" means thermal components based on convection and infrared radiation re-emitted by the glass.

$$TTS = TE + (1 - TE - RE)\frac{h_i}{h_e + h_i}.$$

where $h_e$ and $h_i$ represent the heat transfer coefficients for heat transfer to the outside and the inside, respectively. According to the ISO 9050 standard, the following numerical values are to be used: $h_e$=23 W/($m^2$K) and $h_i$=(3.6+4.4ε6/0.837) W/(m2K), ε represents the emissivity of the layer.

In a particularly advantageous embodiment of the invention, the composite pane includes an emissivity-reducing coating. The emissivity-reducing coating is preferably applied on the exterior-side surface of the inner pane. By combining the infrared protection layer with the emissivity-reducing layer, the total solar energy transmittance TTS can be reduced particularly strongly in the darkened state of the electrochromic functional element.

The emissivity-reducing coating is a thermal-radiation-reflecting coating. Such a coating is often also referred to as a low-E coating or a low emissivity coating. Its function is to prevent the radiation of heat into the interior (thermal radiation from the pane itself) and also to prevent the radiation of heat out of the interior. In the context of the invention, 30 "emissivity" means the normal emissivity at 283 K according to the EN 12898 standard.

The emissivity-reducing coating is preferably a sequence of thin layers (layer structure, layer stack). One layer is an electrically conductive layer, whereas the optical properties (transmittance and reflectivity) of the coating are largely determined by the other layers and and can thus be selectively adjusted by their design. In this regard, so-called antireflection layers, which have a low refractive index of preferably at most 1.8 and particularly preferably at most 1.6, have a particular influence. In particular as a result of interference effects, these antireflection layers can, in particular, increase the transmittance through the pane and reduce reflectivity. The effect depends crucially on the refractive index and layer thickness.

In an advantageous embodiment, the emissivity-reducing coating includes at least one transparent, electrically conductive oxide (TCO). Such layers are corrosion resistant and can be used on exposed surfaces. The emissivity-reducing coating preferably contains indium tin oxide (ITO). However, alternatively, the emissivity-reducing coating can also contain, for example, mixed indium-zinc oxide (IZO), gallium-doped tin oxide (GZO), fluorine-doped tin oxide ($SnO_2$:F), or antimony-doped tin oxide ($SnO_2$:Sb). Preferably, such layers (TCO layers) are arranged between two dielectric layers. Common dielectric layers are, for example:

antireflection layers, which reduce the reflection of visible light and, thus, increase the transparency of the coated pane, for example, based on silicon nitride, mixed silicon-metal nitrides such as silicon-zirconium nitride, titanium oxide, aluminum nitride, or tin oxide, with layer thicknesses, for example, from 10 nm to 100 nm;

matching layers, which improve the crystallinity of the electrically conductive layer, for example, based on zinc oxide (ZnO), with layer thicknesses, for example, from 3 nm to 20 nm;

smoothing layers, which improve the surface structure for the overlying layers, for example, based on a noncrystalline oxide of tin, silicon, titanium, zirconium, hafnium, zinc, gallium, and/or indium, in particular based on mixed tin-zinc oxide (ZnSnO), with layer thicknesses, for example, from 3 nm to 20 nm.

Preferably, the emissivity-reducing coating is built up in one of the following sequences, starting from the surface to be coated:

SiO-ITO-SiN—SiO or

SiN—SiO-ITO-SiN—SiO.

These layer sequences have proved to be particularly advantageous in terms of the amount of reflected thermal radiation and emission reduction.

The thickness of the electrically conductive layer is preferably from 50 nm to 130 nm, particularly preferably from 60 nm to 120 nm, for example, from 70 nm to 100 nm. This yields particularly good results in terms of optical transparency. The thickness of each silicon nitride layer is, independently of one another, preferably from 1 nm to 100 nm, particularly preferably from 5 nm to 70 nm, and in particular from 8 nm to 65 nm. The thickness of the silicon oxide layer is, independently of one another, preferably from 5 nm to 80 nm, particularly preferably from 10 nm to 60 nm, and in particular from 15 nm to 50 nm. In this layer thickness range, particularly good results are achieved in terms of the amount of reflected thermal radiation and emission reduction.

The emissivity-reducing coating and the infrared protection layer are preferably transparent and do not noticeably restrict the view through the pane. The absorption of the emissivity-reducing coating and the infrared protection layer is preferably from about 1% to about 20% in the visible spectral range.

Emissivity-reducing coatings that the composite pane according to the invention can have are known to the person skilled in the art. These can be designed, for example, as disclosed in WO2018206236A1.

In another advantageous embodiment of the composite pane, the infrared protection layer is designed to reflect incident infrared light. This also achieves, for example, the technical advantage that lower energy transmittance TE and lower total solar energy transmittance TTS are achieved.

In another advantageous embodiment of the composite pane, the infrared protection layer is designed to absorb incident infrared light. This also achieves, for example, the technical advantage that entry of infrared light is reduced.

In another advantageous embodiment of the composite pane, the electrochromic functional element is arranged between two layers that include polyvinyl butyral (PVB), ethylene vinyl acetate copolymer (EVA), polyurethane (PU), and/or cyclo-olefin polymer (COP). The layers are preferably based on polyvinyl butyral (PVB). Preferably, the layers contain at least one plasticizer. This achieves, for example, the technical advantage that the functional element is embedded between two suitable layers. The intermediate layer is thus preferably formed from two layers.

In another preferred embodiment, the electrochromic functional element, more precisely the side edges of the electrochromic functional element, are circumferentially surrounded by a third layer. The third layer is frame-like with a cutout into which the electrochromic functional element is inserted. The third layer can be formed by a thermoplastic film, preferably including polyvinyl butyral (PVB), ethylene vinyl acetate copolymer (EVA), polyurethane (PU), and/or cyclo-olefin polymer (COP) and preferably at least one plasticizer, in which the cutout is introduced by cutting. Alternatively, the third layer can also be composed of multiple film sections around the functional element. The intermediate layer is then formed from a total of at least three layers arranged flat atop one another, wherein the middle layer has a cutout in which the electrochromic functional element is arranged. During manufacture, the third layer is arranged between the first and the second layer, with the side edges of all layers preferably situated congruently. The third layer preferably has roughly the same thickness as the functional element. Thus, the local difference in thickness introduced by the locally limited functional element is compensated such that glass breakage during lamination can be avoided and an improved visual appearance is created.

In another advantageous embodiment of the composite pane, at least one of the layers includes dye molecules for neutralizing the color of the electrochromic functional element. Alternatively, the color of the electrochromic functional element in through-vision through the composite pane can also be neutralized by the addition of a colored thermoplastic layer, preferably a colored PVB film. The color of the dye molecules or the thermoplastic layer is preferably yellow or orange. The advantage of this embodiment is achieved in that the inherent color of the electrochromic functional element can be compensated.

In another advantageous embodiment of the composite pane, the electrochromic functional element and/or the infrared protection layer has a thickness from 0.1 mm to mm, preferably from 0.3 nm to 0.5 mm nm. This achieves, for example, the technical advantage that the transparency of the composite pane in the visible range is not affected much.

In another advantageous embodiment of the composite pane, the outer pane and/or the inner pane contain or are made of soda lime glass, quartz glass, or borosilicate glass. The inner pane and/or the outer pane have a thickness from 0.5 mm to 15 mm, particularly preferably from 1 mm to 5 mm. This achieves, for example, the technical advantage that particularly suitable materials are used for the outer pane and/or the inner pane.

The outer pane and the inner pane can be flat glass. This is particularly useful for applications in the building sector. Alternatively, the outer pane and the inner pane can also be curved. This is particularly useful for applications in the automotive sector.

According to a second aspect, this technical object is accomplished by a method for producing a composite pane with an and an inner pane that are areally joined to one another via an intermediate layer. The method comprises the steps:

An infrared protection layer, having at least one silver-containing layer, is arranged or applied on an interior-side surface of the outer pane facing the intermediate layer, on an interior-side surface of the inner pane facing the intermediate layer, or within the intermediate layer.

An electrochromic functional element with electrically controllable optical properties is arranged within the intermediate layer, wherein the total solar energy transmittance TTS of the electrochromic functional element in the darkened state is higher than in the bright state and/or the energy transmittance TE of the electrochromic functional element in the darkened state is higher than in the bright state.

The infrared protection layer interacts with the electrochromic functional element such that the total solar energy transmittance TTS through the composite pane in the darkened state is lower than in the bright state and/or the energy transmittance TE through the composite pane in the darkened state is lower than in the bright state.

The invention further extends to the use of the composite pane according to the invention in means of transportation for travel on land, in the air, or on water, in particular in motor vehicles, wherein the composite pane can, for example, be used as a side window pane and/or a glass roof, preferably as a glass roof. Preferably, the use of the composite pane is as a vehicle glass roof. The composite pane according to the invention can also be used as a functional and/or decorative individual piece and as a built-in component in furniture, appliances, and buildings. The composite pane can also be used as a component of a transparent display.

The various embodiments of the invention can be implemented individually or in any combinations. In particular, the features mentioned above and to be explained below can be used not only in the combinations indicated but also in other combinations or in isolation without departing from the scope of the present invention.

Figure 2:
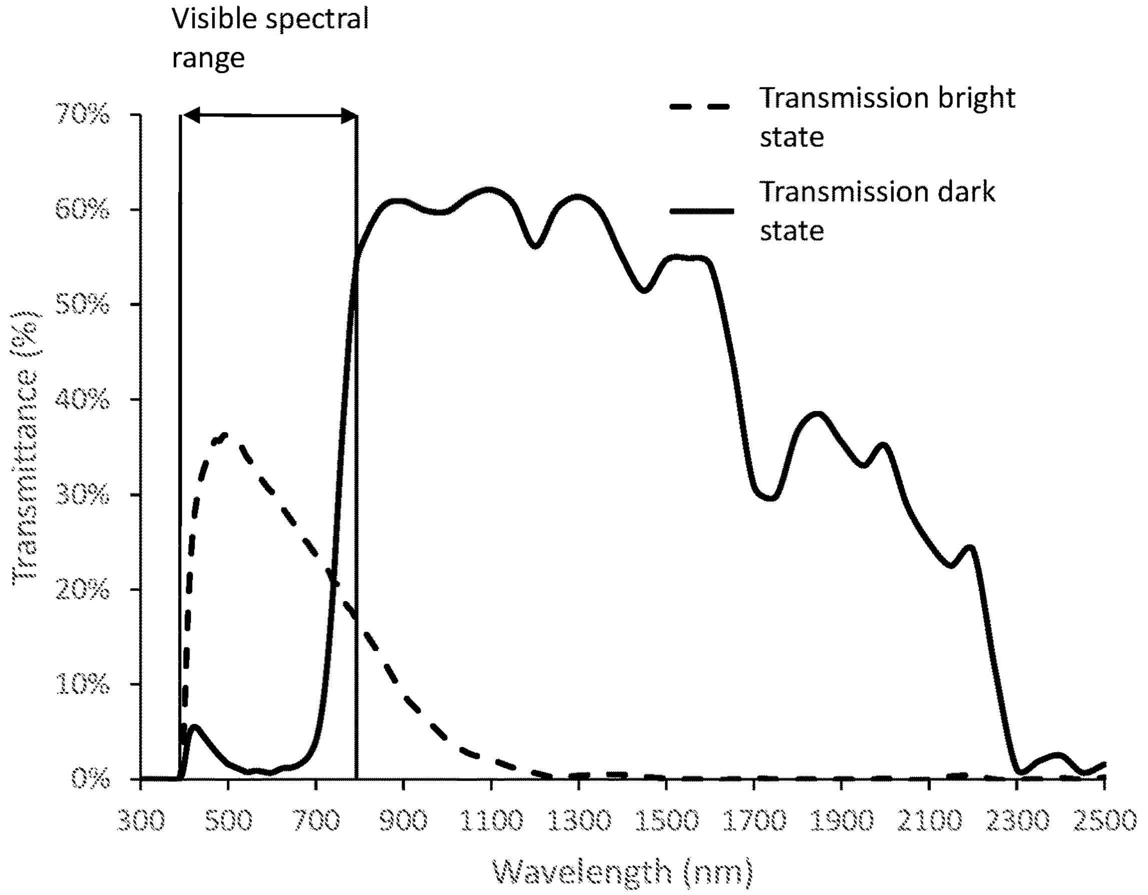
Figure 3:
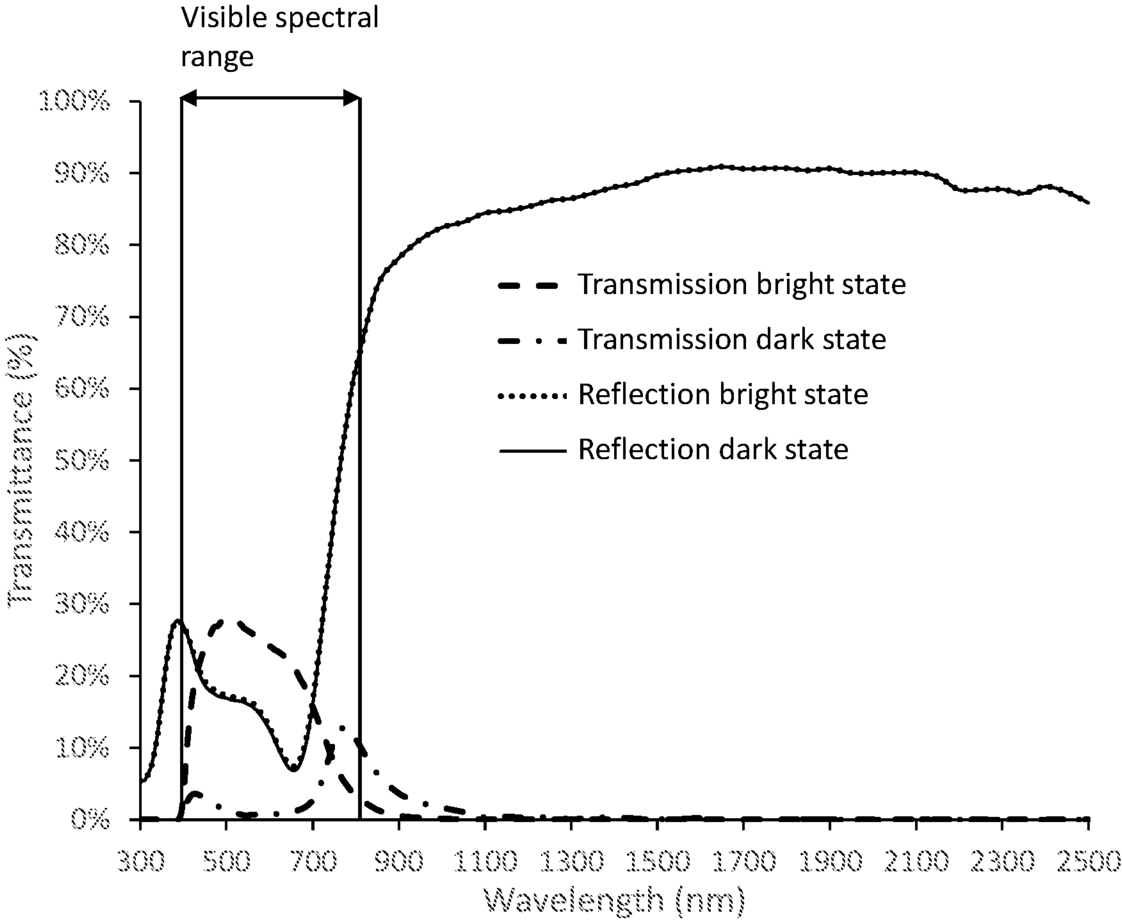
Figure 4:
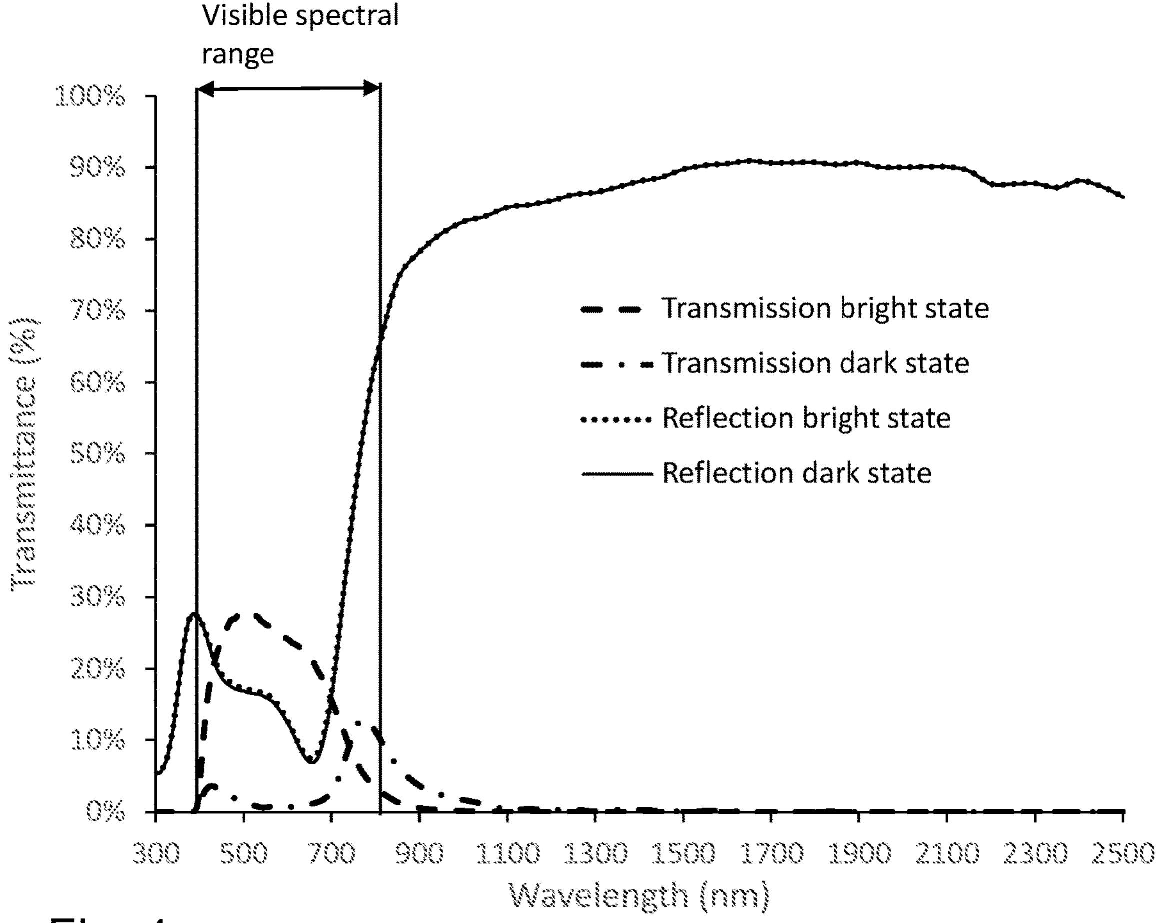

The invention is explained in detail with reference to drawings and exemplary embodiments. The drawings are a schematic representation and are not to scale. The drawings in no way restrict the invention. They depict:

FIG. 1 a schematic cross-sectional view through a composite pane with multiple layers, FIG. 2 transmittance spectra of an electrochromic functional element in the bright and in the darkened state without an infrared protection layer, FIG. 3 transmittance and reflection spectra of an electrochromic functional element in the bright and in the darkened state without the infrared protection layer, FIG. 4 spectra of an electrochromic functional element in the bright and in the darkened state with an infrared protection layer.

Figure 5:
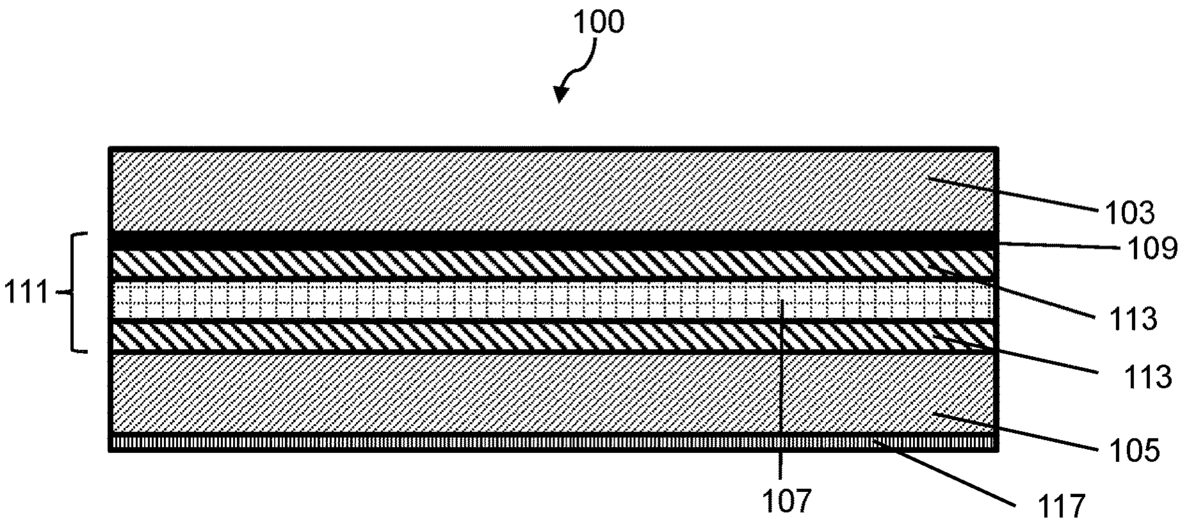

FIG. 5 a schematic stack structure with an emissivity-reducing coating.

Figure 6:
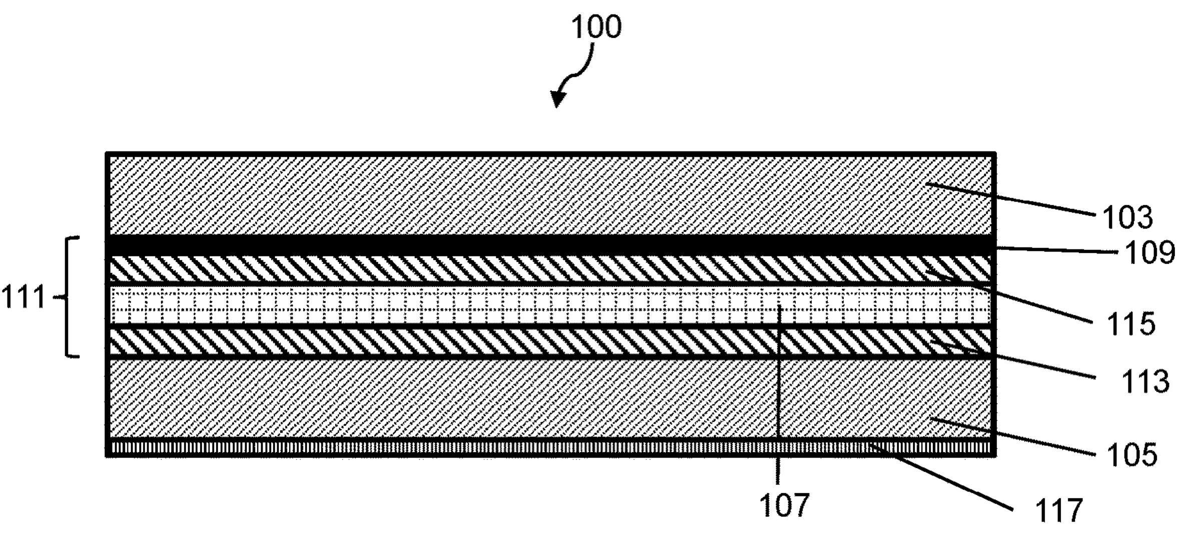

FIG. 6 another schematic stack structure.

Figure 7A:
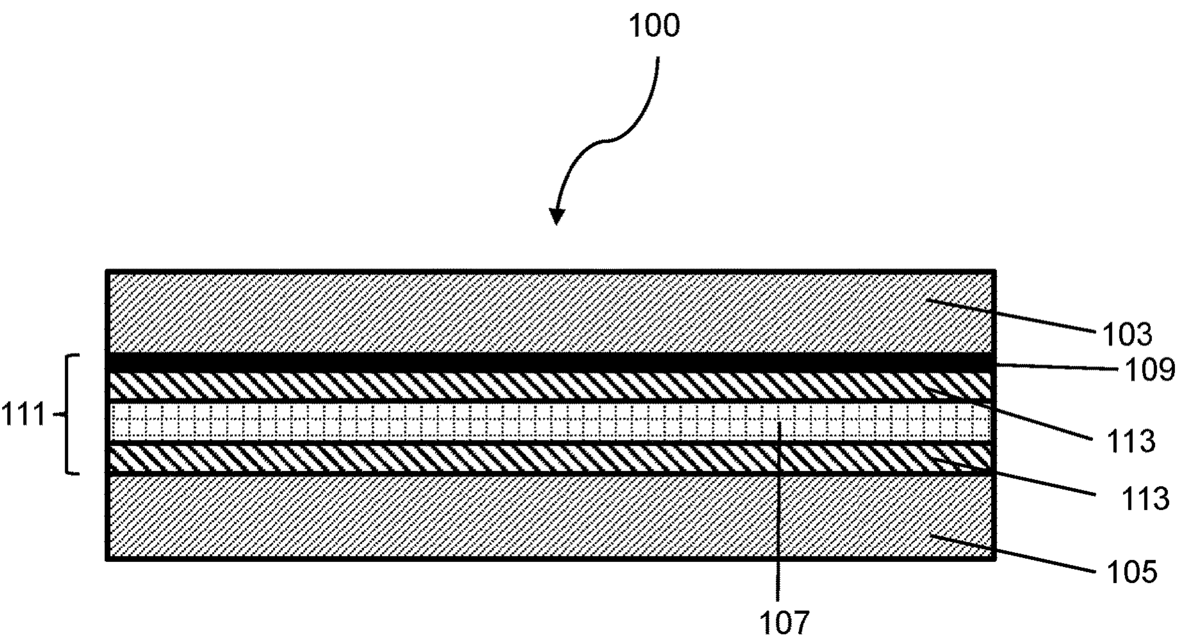

FIG. 7A another schematic stack structure.

Figure 7B:
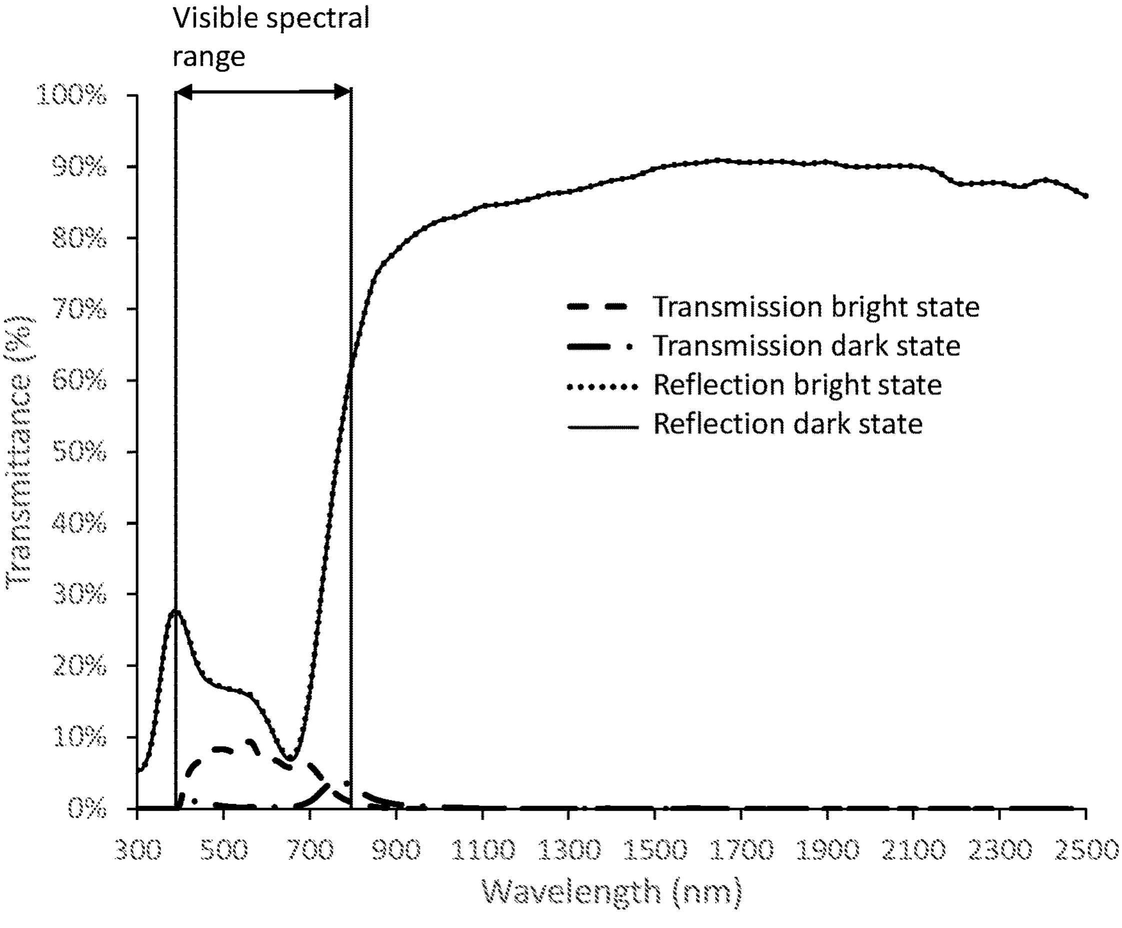
Figure 8A:
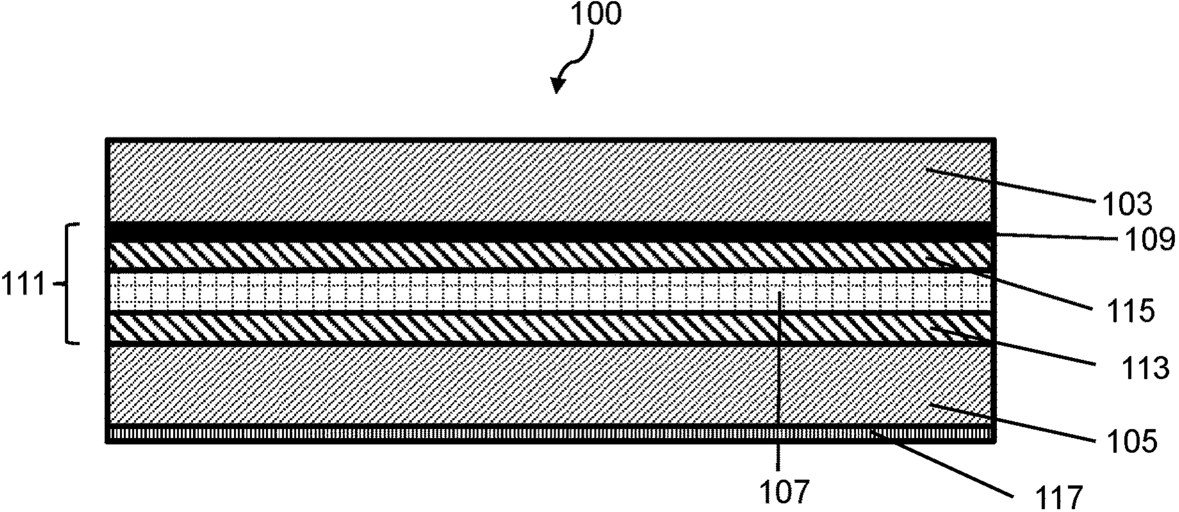

FIG. 7B spectra for a stack structure as shown in FIG. 7A,

FIG. 8A another schematic stack structure.

Figure 8B:
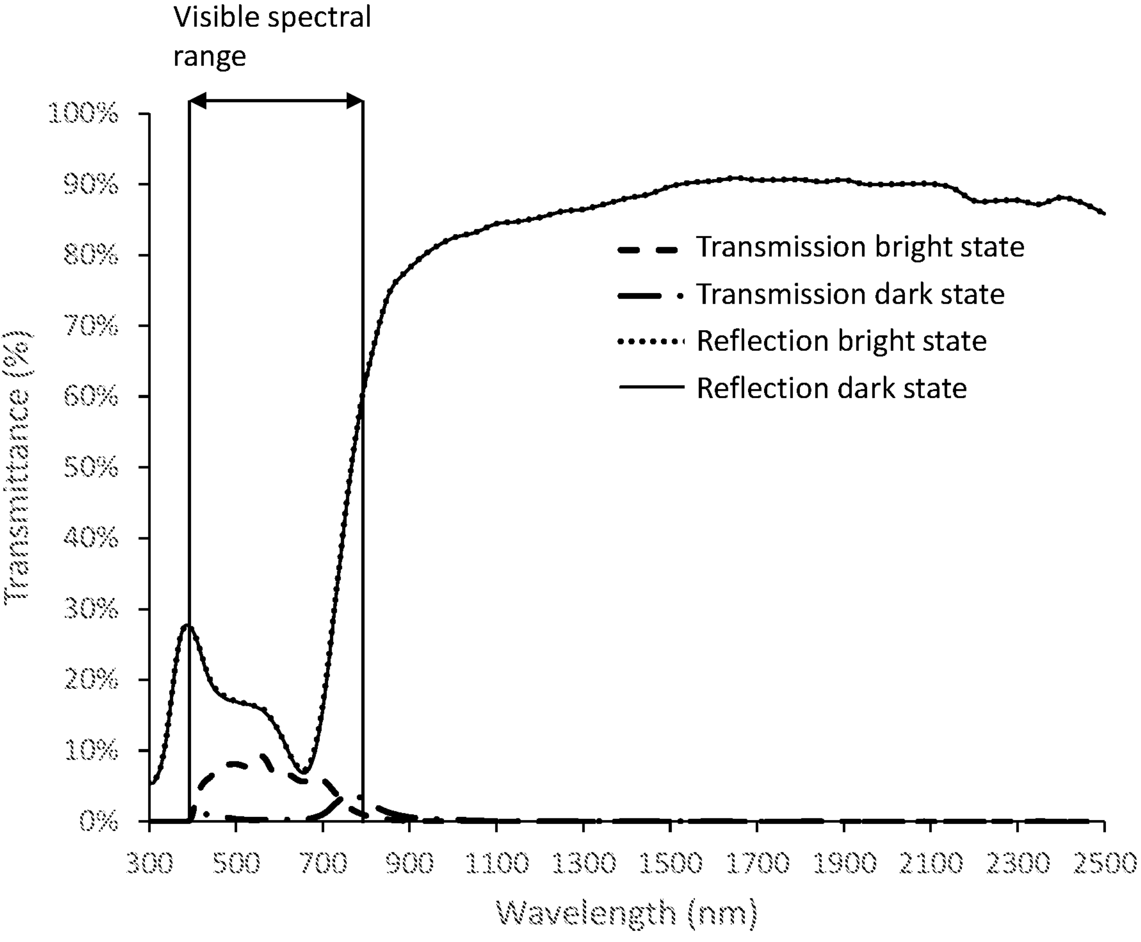
Figure 9:
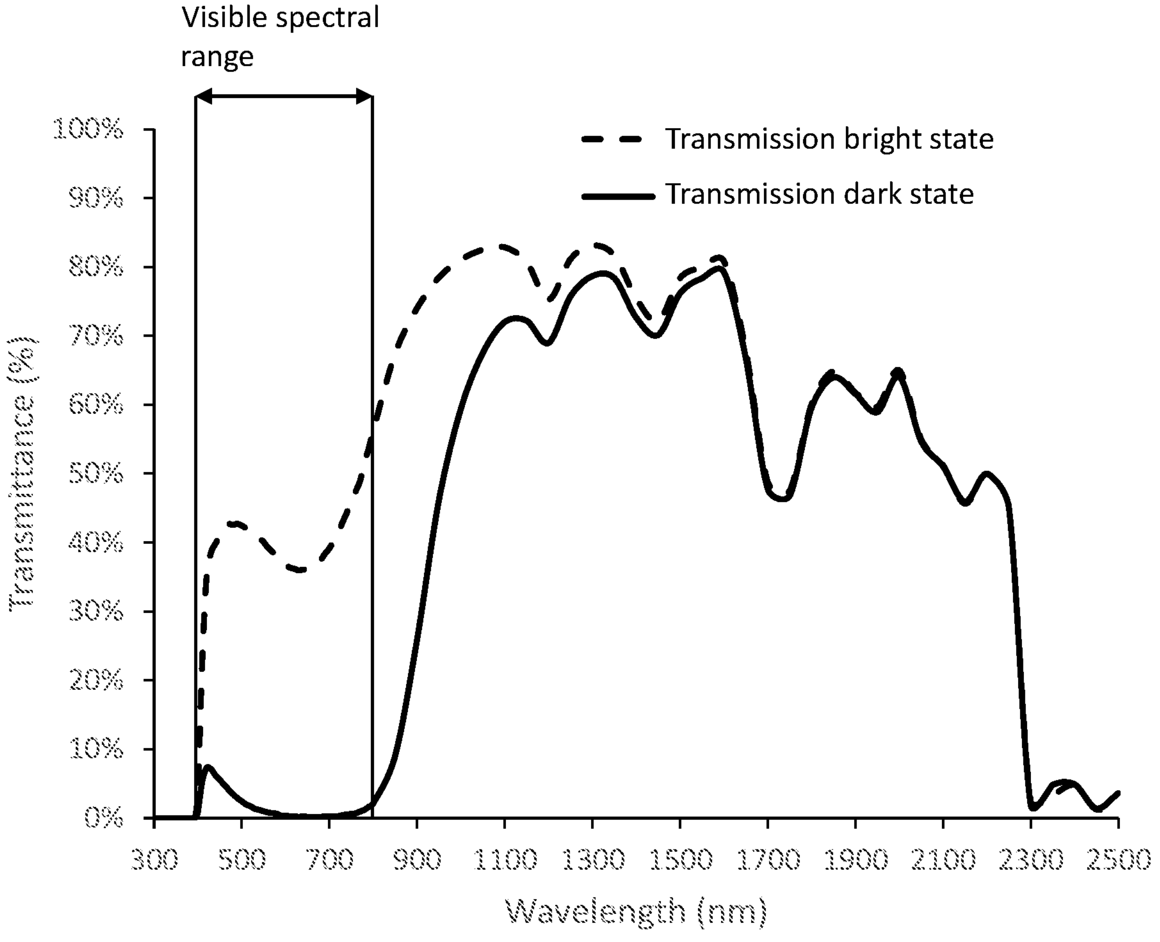

FIG. 8B spectra for a stack structure as shown in FIG. 8A,

FIG. 9 spectra for a stack structure including an SPD functional element without an infrared protection layer.

Figure 10:
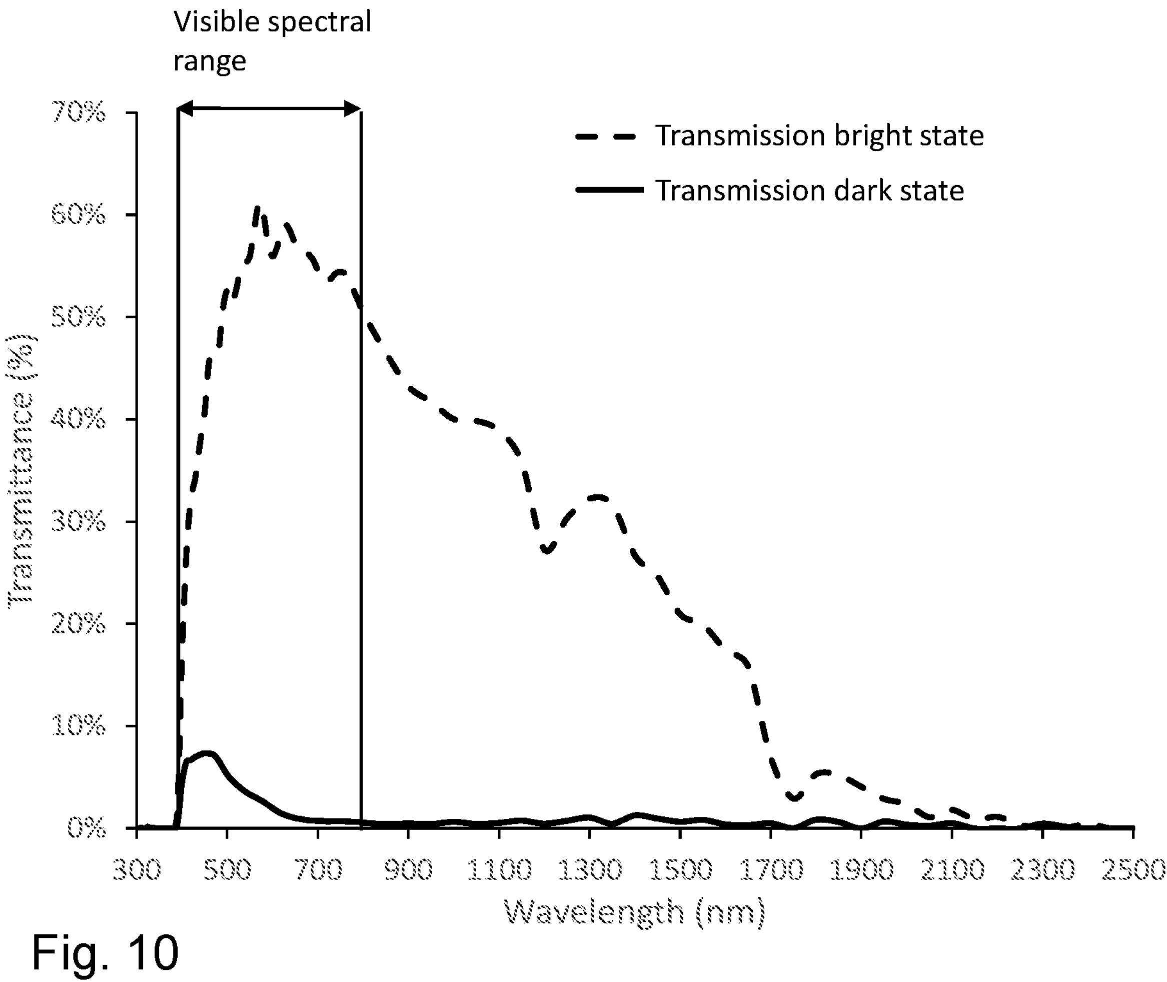
Figure 11:
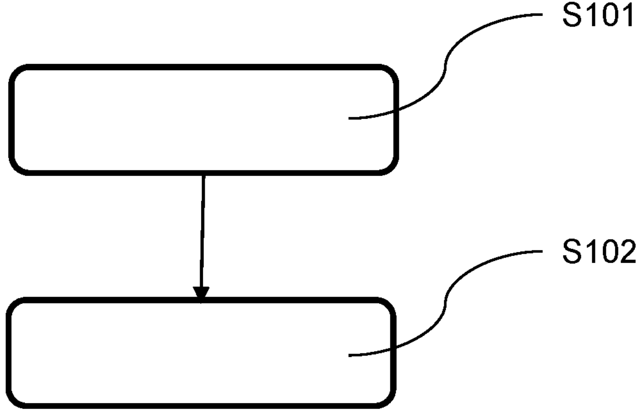

FIG. 10 spectra for a stack structure including another electrochromic functional element without an infrared protection layer, and FIG. 11 a block diagram of a method for producing a composite pane.

FIG. 1 depicts a schematic cross-sectional view through a composite pane 100 with electrically controllable optical properties. The composite pane 100 has multiple layers. An outer pane 103 is areally joined to an inner pane 105 via an intermediate layer 111. The outer pane 103 and the inner pane 105 are stably joined to one another permanently via the intermediate layer 111 by lamination. The intermediate layer 111 comprises at least one thermoplastic adhesive film. The thermoplastic adhesive film contains at least one thermoplastic polymer, preferably ethylene vinyl acetate (EVA) and/or polyvinyl butyral (PVB). Thus, a connection of the intermediate layer 111 to the outer pane 103 and to the inner pane 105 is achieved. The thermoplastic adhesive film can, however, also contain, for example, at least polyurethane, polyethylene, polyethylene terephthalate, polypropylene, polycarbonate, polymethyl methacrylate, polyacrylate, polyvinyl chloride, polyacetate resin, casting resins, acrylates, fluorinated ethylene-propylene, polyvinyl fluoride, and/or ethylene tetrafluoroethylene. The thickness of the thermoplastic adhesive film is preferably from 0.25 mm to 1 mm, for example, 0.38 mm or 0.76 mm.

An electrochromic functional element 107 with electrically controllable optical properties that can be controlled back-and-forth between a bright state and a darkened state is arranged in the intermediate layer 111. In the bright state, the functional element 107 reduces infrared radiation; and in the darkened switched state, the functional element 107 is more permeable to infrared radiation (see FIG. 2). In addition, the intermediate layer 111 has an infrared protection layer 109 for blocking infrared radiation and two polycaprolactone layers (PCL layers) 113, between which the functional element 107 is arranged.

The functional element 107 can, in principle, for example, be applied on the interior-side surface of the outer pane 103 or the inner pane 105. "Interior-side surface" refers to the the surface of a pane that faces the intermediate layer. In a preferred embodiment, the functional element 107 is arranged areally between at least two thermoplastic adhesive films. The functional element 107 is connected to the outer pane 103 via at least one first thermoplastic adhesive film and and to the inner pane 105 via at least one second thermoplastic adhesive film. The first and the second thermoplastic adhesive film make contact with the outer pane 103 or the inner pane 105 and are responsible for the bonding of the functional element 107 to the outer pane 103 and the inner pane 105 to form the composite pane 100.

The outer pane 103 and the inner pane 105 can generally contain non-tempered, partially tempered, or tempered glass, preferably flat glass, float glass, quartz glass, borosilicate glass, soda lime glass, or clear plastics, preferably rigid clear plastics, in particular polyethylene, polypropylene, polycarbonate, polymethyl methacrylate, polystyrene, polyamide, polyester, polyvinyl chloride, and/or mixtures thereof and preferably have a thickness from 0.5 mm to 15 mm, particularly preferably from 1 mm to 5 mm.

FIG. 2 shows transmittance spectra of the electrochromic functional element 107 without an infrared protection layer 109 in the bright state and in the darkened state as a function of wavelength.

In the visible spectral range (400-800 nm), the transmittance of the electrochromic functional element 107 in the dark state or darkened state is lower than in the bright state. In contrast, in the infrared range (800-2500 nm), the transmittance of the electrochromic functional element 107 in the darkened state is higher than in the bright state. In this case, the spectrum is shifted when the functional element 107 is switched.

The transmittance curves show that the bright state blocks the infrared light and the darkened state allows the infrared light to pass. Consequently, the energy transmittance TE and the total solar energy transmittance TTS for the darkened state are higher than for the bright state.

FIG. 3 shows transmittance spectra of the electrochromic functional element 107 without the infrared protection layer 109 in the bright state and in the darkened state. These transmittance spectra correspond to those of FIG. 2. In addition, the reflection spectra of the functional element 107 in the bright state and in the dark state or darkened state are shown.

FIG. 4 shows the transmittance spectra of the electrochromic functional element 107 in the bright state and in the dark or darkened state with the additional infrared protection layer 109. The transmittance of infrared light is essentially blocked in the darkened state of the functional element 107. In contrast, the reflection of infrared light is higher in the darkened state of the functional element 107.

The infrared protection layer 109, such as, infrared-absorbing polyvinyl butyral (PVB) or infrared-reflecting layers, can prevent the thermal irritation caused by infrared radiation. A suitable infrared protection layer 109 can be determined by simulation and optical measurements of the stack structure of the composite pane 100. The objective here is for the energy transmittance TE in the bright state to be greater than in the darkened state is (TE(bright)>TE (darkened)) and the total solar energy transmittance TTS in the bright state to also be greater than in the darkened state is (TTS(bright)>TTS(darkened)).

It turns out that silver-based coatings on glass or polyethylene terephthalate layers (PET layers) are able to provide lower energy transmittance TE and lower total solar energy transmittance TTS for the darkened state than for the bright state. The reason for this is that a silver coating has high reflection in the near infrared range and and also reflects red light in the visible spectral range. By combining a silver-based infrared protection layer 109 with the electrochromic functional element 107, infrared transmittance of the composite pane 100 can be reduced such that the total solar energy transmittance TTS for the darkened state is lower than for the bright state (TTS(darkened)<TTS (bright)). Darkening thus results in protection against the generation of heat in the vehicle, which is expected by the vehicle occupants. In addition, a bluish color of the electrochromic (EC) functional element 107 in the darkened state 203 can be neutralized by adding a yellow PVB intermediate layer.

Depending on the stack structure, the following values are obtained for the light transmittance TL, the energy transmittance TE, and the total solar energy transmittance TTS. The layer sequences mentioned below proceed in order from the outside to the inside.

1. No Infrared Protection Layer

Stack structure—Layer thickness:

A 2.1-mm-thick outer pane 103/a 0.38-mm-thick, uncolored layer 113 based on PVB/an electrochromic functional element 107/a 0.38-mm-thick, uncolored layer 113 based on PVB/a 2.1-mm-thick inner pane 105

The inner pane 105 and the outer pane 103 are made, for example, of soda lime glass.

Light transmittance TL (bright/darkened): 32%/1%

Energy transmittance TE (bright/darkened): 18%/26%

Total solar energy transmittance TTS (bright/darkened): 38%/44%

2. Infrared-Absorbing PVB

Stack structure—Layer thickness:

A 2.1-mm-thick outer pane 103/a 0.38-mm-thick infrared protection layer 109 based on PVB/an electrochromic functional element 107/a 0.38-mm-thick, uncolored layer 113 based on PVB/a 2.1-mm-thick inner pane 105

The inner pane 105 and the outer pane 103 are made, for example, of soda lime glass.

The infrared protection layer is, in this example, an infrared-absorbing layer based on PVB.

Light transmittance TL (bright/darkened): 31%/1%

Energy transmittance TE (bright/darkened): 17%/20%

Total solar energy transmittance TTS (bright/darkened): 38%/40%

3. Nonmetallic Infrared Protection Layer

Stack structure—Layer thickness:

A 2.1-mm-thick outer pane 103/a 0.38-mm-thick, uncolored layer 113 based on PVB/an infrared protection layer 109/a 0.38-mm-thick, uncolored layer 113 based on PVB/an electrochromic functional element 107/a 0.38-mm-thick, uncolored layer 113 based on PVB/a 2.1-mm-thick inner pane 105

Light transmittance TL (bright/darkened): 32%/1%

Energy transmittance TE (bright/darkened): 16%/16%

Total solar energy transmittance TTS (bright/darkened): 33%/33%

The infrared protection layer 109 is a combination of multiple nonmetallic interference layers applied on a film that reflects infrared solar energy with a minimal effect on transmittance in the visible range.

4. Infrared Protection Layer with 3 Silver Layers

Stack structure—Layer thickness:

A 2.1-mm-thick outer pane 103/a 0.38-mm-thick, uncolored layer 113 based on PVB/an infrared protection layer 109/a 0.38-mm-thick, uncolored layer 113 based on PVB/an electrochromic functional element 107/a 0.38-mm-thick, uncolored layer 113 based on PVB a 2.1-mm-thick inner pane 105

Light transmittance TL (bright/darkened): 27%/0.8%

Energy transmittance TE (bright/darkened): 12%/4%

Total solar energy transmittance TTS (bright/darkened): 27%/21%

In this example, the infrared protection layer 109 consists of a silver-containing transparent polyethylene terephthalate (PET) film embedded between layers 113 based on PVB to provide a protective barrier against harmful solar radiation. The infrared protection layer 109 has, in this example, 3 silver layers. The silver layers are separated from one another by dielectric layers.

5. Infrared Protection Layer with 2 Silver Layers

Stack structure—Layer thickness:

A 2.1-mm-thick outer pane 103/an infrared protection layer 109/a 0.38-mm-thick, uncolored layer 113 based on PVB/an electrochromic functional element 107/a 0.38-mm-thick, uncolored layer 113 based on PVB/a 2.1-mm-thick inner pane 105

Light transmittance TL (bright/darkened): 26%/0.8%

Energy transmittance TE (bright/darkened): 13%/7%

Total solar energy transmittance TTS (bright/darkened): 29%/25%

The infrared protection layer 109 is silver-based and reflects light in the infrared range from 800 nm upward. The infrared protection layer 109 has, in this example, 2 silver layers. In this example, the infrared protection layer 109 is applied directly on the interior-side surface, i.e., the surface facing the layers 113, of the outer pane 103.

6. Infrared Protection Layer with 3 Silver Layers

Stack structure—Layer thickness:

A 2.1-mm-thick outer pane 103/an infrared protection layer 109/a 0.38-mm-thick, uncolored layer 113 based on PVB/an electrochromic functional element 107/a 0.38-mm-thick, uncolored layer 113 based on PVB/a 2.1-mm-thick inner pane 105

Light transmittance TL (bright/darkened): 25%/0.8%

Energy transmittance TE (bright/darkened): 11%/3%

Totale solare energy transmittance TTS (bright/darkened): 23%/17%

The infrared protection layer 109 with 3 silver layers blocks the TE and TTS through the composite pane even better than the infrared protection layer 109, as shown in Example 6.

7. Infrared Protection Layer with 3 Silver Layers and an Emissivity-Reducing Coating Stack structure—Layer thickness:

A 2.1-mm-thick outer pane 103/an infrared protection layer 109/a 0.38-mm-thick, uncolored layer 113 based on PVB/an electrochromic functional element 107/a 0.38-mm-thick, uncolored layer 113 based on PVB/a 2.1-mm-thick inner pane 105/an emissivity-reducing coating 117

The emissivity-reducing coating 117 with low emissivity (low E-layer) is a layer configured to reflect thermal radiation at room temperature or to lower emission. The emissivity-reducing coating 117 is, for example, a layer sequence having an ITO layer. The wavelength range of the reflection is, for example, 10 μm. Since the glass is not transparent in this wavelength range, this layer is situated on the exterior-side surface of the inner pane 100.

Light transmittance TL (bright/darkened): 25%/0.8%

Energy transmittance TE (bright/darkened): 11%/3%

Total solar energy transmittance TTS (bright/darkened): 20%/13%

FIGS. 4, 7, and 8 show the optical behavior of the above-mentioned Example 6, in which an infrared protection layer 109 with 3 silver layers is used. It can be seen that the infrared transmittance of the composite pane 100 can be completely suppressed in the darkened state, except for a small peak around a wavelength of 800 nm. A particularly preferred stack structure for an application in the automotive sector is a combination with an emissivity-reducing coating 117, as shown in the Example 7.

In addition, color matching of the composite pane 100 can be carried out. In general, it is also possible to add electrochromic molecules to the electrochromic functional element 107 that switch to yellow or red to produce an overall neutral gray color. As an alternative, dyes can also be used in the thermoplastic layer 113. Such colored thermoplastic layers 113, which are preferably formed based on PVB, are not actively switchable and affect both the bright and the darkened state equally.

FIG. 5 depicts a schematic stack structure of the composite glass pane 100. The stack structure corresponds to the Example 7 with two clear layers 113, formed, for example, based on PVB. In contrast to Examples 1 to 6, the composite pane 100 has an emissivity-reducing coating 117 on the exterior-side surface of the inner pane 105. The composite pane 100 has different colorations in the bright, i.e., transparent, state and the darkened state (see Table 1).

TABLE 1

Colorations for the bright and darkened state of the composite pane 100 of FIG. 5.

| L*a*b*-color space | L* | a* | b* |
|---|---|---|---|
| Bright state | 57 | −7.2 | 5.0 |
| Darkened state | 8 | 7.9 | −18.0 |

FIG. 6 depicts another schematic stack structure of the composite glass pane 100. The stack structure corresponds to the Example 7, in which the clear thermoplastic layer 113, formed, for example, based on PVB, has been replaced by a colored, yellow thermoplastic layer 115, formed, for example, based on PVB. This achieves a color match with respect to the functional element 107. The color matching is carried out with the colored, yellow layer 115. The concentration of a dye can be adjusted to the thickness of the layer 115. As a result of the yellow color of the colored layer 115, a neutral gray color of the composite pane 100 is obtained when the color values of the functional layer 107 are in the blue range. The composite pane 100 has corresponding colorations in the bright, i.e., transparent, state and the darkened state (see Table 2).

TABLE 2

Colorations for the bright and darkened state of the composite pane 100 of FIG. 6.

| L*a*b*-color space | L* | a* | b* |
|---|---|---|---|
| Bright state | 57 | −9.1 | 11.0 |
| Darkened state | 8 | 5.6 | −14.7 |

Instead of a colored layer 115, formed based on PVB, other layers can be used, such as, ethylene vinyl acetate copolymer (EVA), polyurethane (PU), or cyclo-olefin polymer (COP). The same applies to acoustic PVB or PVB with infrared-absorbing particles.

FIG. 7A shows another schematic cross-sectional view through a composite pane 100 with multiple layers. FIG. 7B shows the spectra associated with FIG. 7A. The composite pane 100 has a tinted lower glass (VG10) as the inner pane 105. The tinted glass is a gray glass with light transmittance of 28%. The infrared protection layer 109 is a three-ply silver layer on the interior-side surface of the outer pane 103. This structure of the composite pane 100 also covers a realistic application due to the lower light transmittance and achieves improved color neutrality.

Stack structure—Layer thickness:

A 2.1-mm-thick outer pane 103/an infrared protection layer 109/a 0.38-mm-thick, uncolored layer 113 based on PVB/an electrochromic functional element 107/a 0.38-mm-thick, uncolored layer 113 based on PVB/a 2.1-mm-thick tinted inner pane 105

Light transmittance TL (bright/darkened): 7.8%/0.2%

Energy transmittance TE (bright/darkened): 3.5%/0.7%

Total solar energy transmittance TTS (bright/darkened): 17.5%/15.6%

FIG. 8A shows another schematic cross-sectional view through a composite pane 100 with multiple layers. FIG. 8B shows the spectra associated with FIG. 8A. The composite pane 100 has a tinted lower glass (VG10) as the inner pane 105 and an emissivity-reducing coating 117 that is designed to reflect the thermal radiation at room temperature or to lower the emission. The emissivity-reducing coating is, for example, a layer sequence having an ITO layer. The tinted glass is a gray glass with light transmittance of 28%. The infrared protection layer 109 is, for example, a three-ply silver-layer that is applied on the interior-side surface of the outer pane 103. This structure of the composite pane 100 covers a realistic application due to the lower light transmittance. The structure with the emissivity-reducing coating 117 (low-E layer) has approx. the same spectrum and thus the same TL and TE as that shown in FIG. 7B, without the emissivity-reducing coating 117. However, the composite pane 100 with the emissivity-reducing coating 117 has significantly better TTS values. This effect is achieved by the emissivity-reducing coating 117.

Stack structure—Layer thickness:

A 2.1-mm-thick outer pane 103/an infrared protection layer 109/a 0.38-mm-thick, uncolored layer 113 based on PVB/an electrochromic functional element 107/a 0.38-mm-thick, uncolored layer 113 based on PVB/a 2.1-mm-thick tinted inner pane 105/an emissivity-reducing coating 117

Light transmittance TL (bright/darkened): 7.6%/0.2%

Energy transmittance TE (bright/darkened): 3.4%/0.7%

Total solar energy transmittance TTS (bright/darkened): 13.4%/11.2%

FIG. 9 shows a transmittance spectrum for an SPD functional element (SPD—suspended particle device) without application of an infrared protection layer 109 in the bright state and in the darkened state as a function of wavelength. The SPD functional element is inserted in a composite pane 100, and the stack structure of the composite pane 100 is:

A 2.1-mm-thick outer pane 103/a 0.38-mm-thick, uncolored layer 113 based on PVB/an SPD functional element/a 0.38-mm-thick, uncolored layer 113 based on PVB a 2.1-mm-thick inner pane 105

The inner pane 105 and the outer pane 103 are made, for example, of soda lime glass.

In the visible spectral range (380 nm to 780 nm), the transmittance of the SPD functional element in the dark state or darkened state is lower than in the bright state. In the infrared range (780 nm to 2500 nm), the transmittance of the SPD functional element in the darkened state, in particular in the higher frequency infrared range (780 nm to 1300 nm), is also lower than in the bright state. In this case, no shift in the spectrum occurs when switching the SPD functional element.

The transmittance curves show that SPD functional elements do not have the problems that the bright state blocks the infrared light and the dark state allows infrared light to pass. The energy transmittance TE and the total solar energy transmittance TTS for the darkened state are significantly lower than for the bright state.

Light transmittance TL (bright/darkened): 38.7%/0.8%

Energy transmittance TE (bright/darkened): 50.9%/21.2%

Total solar energy transmittance TTS (bright/darkened): 62.3%/40.8%

FIG. 10 shows a transmittance spectrum for a different electrochromic functional element, not functioning in the context of the invention, without use of an infrared protection layer in the bright state and in the darkened state as a function of wavelength. The different electrochromic functional element differs from the electrochromic functional elements 107 of Examples 1 to 7 and FIGS. 1 to 8. The different electrochromic functional element is inserted in a composite pane 100, and the stack structure of the composite pane 100 is:

A 2.1-mm-thick outer pane 103/a 0.38-mm-thick, uncolored layer 113 based on PVB/a different electrochromic functional element/a 0.38-mm-thick, uncolored layer 113 based on PVB/a 2.1-mm-thick inner pane 105

In the visible spectral range (400-800 nm), the transmittance of the different electrochromic functional element in the dark state or darkened state is lower than in the bright state. In contrast, in the infrared range (800-2500 nm), the transmittance of the different electrochromic functional element in the darkened state is slightly lower than in the bright state.

The transmittance curves show that not all electrochromic functional elements have the problems that the bright state blocks the infrared light and the dark state allows the infrared light to pass. The energy transmittance TE and the total solar energy transmittance TTS for the darkened state are, for certain electrochromic functional elements (e.g., the one shown in this example), significantly lower than for the bright state.

Light transmittance TL (bright/darkened): 56.9%/2.8%

Energy transmittance TE (bright/darkened): 41.7%/2.0%

Total solar energy transmittance TTS (bright/darkened): 55.6%/27.2%

FIG. 11 depicts a block diagram of a method for producing the composite pane 100. In step S101, an infrared protection layer 109 for blocking infrared radiation is applied on an outer pane 103 or an inner pane 104 or arranged within an intermediate layer 111. In step S102, an electrochromic functional element 107 with electrically controllable optical properties is arranged within the intermediate layer 111. In the case of the electrochromic functional element, the total solar energy transmittance TTS in the darkened state is higher than in the bright state and/or the energy transmittance TE in the darkened state is higher than in the bright state. Then, the outer pane 103 and the inner pane 105 are joined to one another via the intermediate layer 111 to form a composite pane 100. In this case, the total solar energy transmittance TTS through the composite pane 100 in the darkened state is lower than in the bright state and/or the energy transmittance TE through the composite pane (100) in the darkened state is lower than in the bright state.

This composite pane 100 meets the expectations of automakers in terms of thermal comfort (TTS(bright)>TTS (darkened)), aesthetics (color), and durability. The composite pane 100 achieves the technical advantage of preventing unwanted heating of a vehicle interior and thermal irritation of a vehicle occupant.

All features explained and shown in connection with individual embodiments of the invention can be provided in different combinations in the object of the invention in order to realize their advantageous effects at the same time.

All steps of the method can be implemented by equipment suitable for carrying out the respective steps. All functions that can be performed by features of the object can constitute a step of a method.

The scope of protection of the present invention is indicated by the claims and is not limited by the features explained in the description or shown in the figures.

LIST OF REFERENCE CHARACTERS

100 composite glass pane
103 outer pane
105 inner pane
107 electrochromic functional element
109 infrared protection layer
111 intermediate layer
113 layer
115 colored layer
117 emissivity-reducing coating

The invention claimed is:

1. A composite pane with electrically controllable optical properties, comprising:

an outer pane and an inner pane that are joined to one another areally via an intermediate layer;

an electrochromic functional element with electrically controllable optical properties within the intermediate layer, wherein a total solar energy transmittance TTS in a darkened state of the electrochromic functional element is higher than in a bright state of the electrochromic functional element and/or an energy transmittance TE in the darkened state is higher than in the bright state; and an infrared protection layer which has at least one silver-containing layer and is applied or arranged on an interior-side surface of the inner pane facing the intermediate layer, on an interior-side surface of the outer pane facing the intermediate layer, or within the intermediate layer, which infrared protection layer interacts with the electrochromic functional element such that the total solar energy transmittance TTS through the composite pane in the darkened state is lower than in the bright state and/or the energy transmittance TE through the composite pane in the darkened state is lower than in the bright state, wherein a light transmittance TL through the composite pane in the bright state of the electrochromic functional element is greater than or equal to 20%, and wherein the light transmittance TL through the composite pane in the darkened state of the electrochromic functional element is lower than or equal to 15%.

2. The composite pane according to claim 1, wherein the infrared protection layer is arranged areally between the outer pane and the electrochromic functional element.

3. The composite pane according to claim 1, wherein the infrared protection layer is applied on the surface of the outer pane facing the intermediate layer or on a polyethylene terephthalate layer, wherein the polyethylene terephthalate layer with the infrared protection layer is arranged within the intermediate layer.

4. The composite pane according to claim 1, wherein the infrared protection layer includes at least 2 silver layers.

5. The composite pane according to claim 4, wherein the infrared protection layer includes at least 3 silver layers.

6. The composite pane according to claim 1, wherein the total solar energy transmittance TTS of the composite pane in the bright state of the electrochromic functional element is less than or equal to 35%.

7. The composite pane according to claim 6, wherein the total solar energy transmittance TTS of the composite pane in the bright state of the electrochromic functional element is less than or equal to 15%.

8. The composite pane according to claim 1, wherein an emissivity-reducing coating is applied areally on an exterior-side surface of the inner pane facing away from intermediate layer.

9. The composite pane according to claim 8, wherein the emissivity-reducing coating comprises an electrically conductive oxide (TCO).

10. The composite pane according to claim 9, wherein the electrically conductive oxide (TCO) is indium tin oxide (ITO).

11. The composite pane according to claim 1, wherein the infrared protection layer is designed to reflect incident infrared light.

12. The composite pane according to claim 1, wherein the electrochromic functional element is arranged between two layers that each comprise a material selected from the group consisting of polyvinyl butyral (PVB), ethylene vinyl acetate copolymer (EVA), polyurethane (PU), and cyclo-olefin polymer (COP).

13. The composite pane according to claim 12, wherein at least one of the two layers includes dye molecules for neutralizing the color of the electrochromic functional element.

14. The composite pane according to claim 1, wherein the at least one silver-containing layer of the infrared protection layer has a thickness of 5 nm to 50 nm.

15. A method for producing a composite pane with an outer pane and an inner pane that are joined to one another areally via an intermediate layer, the method comprising:

arranging or applying an infrared protection layer, having at least one silver-containing layer, on an interior-side surface of the outer pane facing the intermediate layer, on an interior-side surface of the inner pane facing the intermediate layer, or within the intermediate layer, and arranging an electrochromic functional element with electrically controllable optical properties within the intermediate layer, wherein a total solar energy transmittance TTS in a darkened state of the electrochromic functional element is higher than in a bright state of the electrochromic functional element and/or an energy transmittance TE in the darkened state is higher than in the bright state, wherein the infrared protection layer interacts with the electrochromic functional element such that the total solar energy transmittance TTS through the composite pane in the darkened state is lower than in the bright state and/or the energy transmittance TE through the composite pane in the darkened state is lower than in the bright state, wherein a light transmittance TL through the composite pane in the bright state of the electrochromic functional element is greater than or equal to 20%, and wherein the light transmittance TL through the composite pane in the darkened state of the electrochromic functional element is lower than or equal to 15%.

16. The composite pane according to claim 1, wherein the outer pane and/or the inner pane contain or are made of soda lime glass and have a thickness of 0.5 mm to 15 mm.

17. The composite pane according to claim 16, wherein thickness is from 1 mm to 5 mm.

18. The composite pane according to claim 14, wherein the at least one silver-containing layer of the infrared protection layer has a thickness of 8 nm to 25 nm.

* * * * *